United States Patent
Ghosn

(10) Patent No.: US 9,512,584 B2
(45) Date of Patent: Dec. 6, 2016

(54) IN-SITU BURNING FIRE AREA MONITORING SYSTEM AND METHODS OF USE

(71) Applicant: Michel Ghosn, Sugar Land, TX (US)

(72) Inventor: Michel Ghosn, Sugar Land, TX (US)

(*) Notice: Subject to any disclaimer, the term of this patent is extended or adjusted under 35 U.S.C. 154(b) by 965 days.

(21) Appl. No.: 13/768,193

(22) Filed: Feb. 15, 2013

(65) Prior Publication Data

US 2013/0224668 A1  Aug. 29, 2013

Related U.S. Application Data

(60) Provisional application No. 61/603,944, filed on Feb. 28, 2012.

(51) Int. Cl.
*E02B 15/04* (2006.01)

(52) U.S. Cl.
CPC .................. *E02B 15/042* (2013.01)

(58) Field of Classification Search
USPC ................... 431/6, 13; 340/539.26
See application file for complete search history.

(56) References Cited

U.S. PATENT DOCUMENTS

| | | | | | |
|---|---|---|---|---|---|
| 3,636,544 | A | * | 1/1972 | Codina | G08B 21/084 200/61.04 |
| 3,719,936 | A | * | 3/1973 | Daniels | G08B 21/20 340/539.1 |
| 5,959,589 | A | * | 9/1999 | Sadovnik | H01Q 3/04 343/757 |

* cited by examiner

*Primary Examiner* — Avinash Savani
(74) *Attorney, Agent, or Firm* — Benjamin Aaron Adler

(57) ABSTRACT

Provided herein are devices, systems and methods for the in situ monitoring of a fire burning area. The device comprises a flotation unit having a body housing, an electronic unit with a radiofrequency antenna exteriorly disposed thereon configured to monitor, record and transmit/receive data obtained from within a burning fire, such as an oil fire, wirelessly to a primary collecting unit and, optionally, an ignition unit to ignite the fire. The system comprises the flotation units, means for connecting the units for deployment on the water and the hardware/software necessary to run the system and analyze and calculate temperature, position and surface area of the burn. The flotation devices communicate wirelessly to each other and to a primary collecting unit which provides the communicated data to a processing unit.

21 Claims, 13 Drawing Sheets

IN-SITU BURNING FIRE AREA MONITORING SYSTEM AND METHODS OF USE

CROSS-REFERENCE TO RELATED APPLICATIONS

This nonprovisional application claims benefit of priority under 35 U.S.C. §119(e) of provisional application U.S. Ser. No. 61/603,944, filed Feb. 28, 2012, the entirety of which is hereby incorporated by reference.

BACKGROUND OF THE INVENTION

Field of the Invention

The present invention relates to the fields of computer science, wireless communication and information technology and of oil spill containment. More specifically, the present invention discloses an in-situ fire area monitoring system and uses thereof.

Description of the Related Art

Understanding the science of removing oil by burning is extremely valuable when trying to address environmental impacts. The accuracy of the collected data can help planners respond more effectively to oil spills. However, there has been little progress in Currently, techniques to monitor an oil fire on the open sea utilize a surveillance plane in VHF communication with one or more fleet vessels at sea. A spotter on the plane directs the burn team to thicker burnable oil and subsequently confirms that the fire is out.

For example, a general in situ burning technique utilized today employs boats and fire-resistant booms to contain the spilled oil and to keep it from spreading. The boom, attached to the boats by towing lines, is pulled to form a U shape such that the open end of the U is maneuvered through the oil slick to collect oil at the back end of the boom. The collected oil is burned in situ as the boats pull away from the main oil slick and stay ahead of the current to ensure the burning oil stays at the back of the U shape of the boom. Small, monitoring teams, collecting real-time data using portable instruments, are deployed at various locations, such as downwind or upwind of the smoke plume relay data back to a command vessel.

However, on the open sea, there may be a limited window of opportunity for in situ burning. This requires that the monitoring teams be ready to mobilize, upon notification, fully prepared to reach the burning site by any means necessary within the window, usually a few hours at most. Thus, there is a recognized need in the art for improved systems for monitoring an in situ burning fire area that minimize the risks inherent in current in situ fire burning monitoring operations.

The prior art is deficient in a very low cost, easy to deploy system that is accurate in real-time monitoring and recording data from an in-situ burning fire area. Particularly, the prior art is deficient in in situ burning fire area monitoring systems in which the fire is monitored and the data is recorded from directly within the fire burning area. The present invention fulfills this longstanding need and desire in the art.

SUMMARY OF THE INVENTION

The present invention is directed to a device for monitoring a burning fire area. The device comprises a body housing that houses means for measuring and recording data within the fire burning area, means for receiving and transmitting the recorded data and means for powering the device.

The present invention is directed to a related device further comprising a body housing having a cylindrical body with a body cover disposed thereon. A cap is disposed on an upper end of the cylindrical body and a pair of attachment points are disposed diametrically on a lower end of the cylindrical body. A shell having a plurality of openings is disposed proximate to the cylindrical body in a covering relationship.

The present invention is directed to another related device where the body housing further comprises an attachment guiding structure disposed proximate to the attachment points on the cylindrical body.

The present invention is directed to yet another related further comprising means for igniting the fire are. An ignition unit is disposed around the body housing and has a plurality of ignition tubes and a control unit configured to receive a wireless ignition signal. The ignition tubes comprising a fuse disposed therein that is in electronic communication with the control unit and a flare in contact with the fuse.

The present invention also is directed to a flotation unit for monitoring a burning fire area. The flotation unit comprises a temperature-resistant body housing having a body cover disposed thereon. A cap is disposed on a first end of the body housing. A fire-monitoring electronic unit and one or more batteries are disposed within the body housing. An antenna is disposed exteriorly through the cap and in electronic communication with the fire-monitoring electronic unit. A shell is disposed around and proximate to the body cover of the body housing and comprises a plurality of openings on the surface thereof.

The present invention is directed to a related flotation unit further comprising a pair of attachment points diametrically disposed on a lower end of the body housing and an attachment guiding structure disposed proximate to the attachment points.

The present invention is directed to another related flotation unit further comprising a tube extending downwardly from an upper surface of the cap to the fire-monitoring electronic unit where the antenna is disposed within the tube.

The present invention is directed to another related flotation unit further comprising an ignition unit disposed around the shell. The ignition unit comprises a control unit in electronic communication with the flotation unit and a plurality of ignition tubes each containing a fuse in electronic communication with the control unit and a flammable material comprising a flare in contact with the fuse.

The present invention is directed further to a system for in situ monitoring of a burning fire area at sea. The system comprises a plurality of the flotation units described herein and a first collecting unit where each of the flotation units comprising the plurality is in wireless communication with the other flotation units and with the first collecting unit. The system also comprises one or more computers is in electronic communication with the first collecting unit and software applications tangibly stored in the one or more computers that comprise processor-executable instructions enabling analysis and display of the data received from the first collecting unit.

The present invention is directed to a related system further comprising a second collecting unit in wireless communication with the plurality of flotation units where the second collecting unit is in electronic communication with the one or more computers.

The present invention is directed to another related system further comprising a plurality of interconnectable, compressible flotation rings where each comprises attachment rings disposed around the perimeter of the flotation ring whereby the flotation rings are interconnected and where the attachment rings are configured to receive the flotation units therein.

The present invention is directed further still to a method for in situ monitoring of burning oil in real time. The method comprises deploying the net comprising the plurality of the flotation units of the system described herein onto an area of an oil slick and activating the flotation units which is followed by ignition of the area of the oil slick. In real time; the position of each flotation unit and the temperature and capacitance data at each of the flotation units disposed within the burning area is recorded and the recorded data is wirelessly transmitted to first and second collecting units and, thereby, to computers electronically linked thereto for monitoring of the data.

The present invention is directed to a related method further comprising calculating distance between flotation units and surface area of the burning oil via software tangibly stored in a computer memory.

The present invention is directed to another related method further comprising video monitoring the burning area and displaying the video in real time with the transmitted recorded data.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
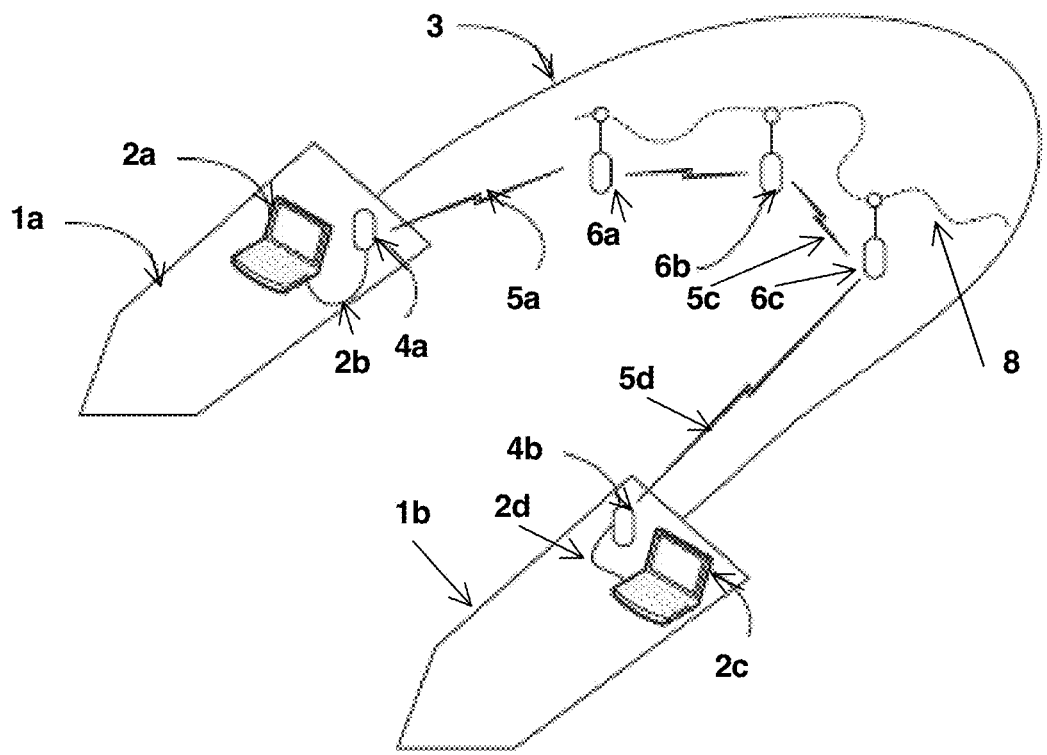
FIG. 1 is an overview of the in-situ fire burning area monitoring system.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the terms "computer" or "computer system" generally includes: a processor, a memory, at least one information storage/retrieval apparatus such as, for example, a hard drive, a disk drive or a flash drive or memory stick, or other computer readable media, as is known in the art, at least one input apparatus such as, for example, a keyboard, a mouse, a touch screen, or a microphone; and a display structure, such as the well-known computer screen. Additionally, the computer may include one or more network connections, such as wired or wireless connections. Such a computer or computer system may include more or less than what is listed above and encompasses other electronic media, such as iPads, etc. As such, the software applications, algorithms, etc. utilized in the in situ monitoring system provided herein may be tangibly stored in a memory on a computer, computer readable media or other electronic media, for example, as processor executable computer program products. The hardware comprising the computer or computer system is well-known in the art.

In one embodiment of the invention there is provided a device for monitoring a burning fire area, comprising a body housing that houses means for measuring and recording data within the fire burning area; means for receiving and transmitting the recorded data; and means for powering the device.

In this embodiment, the means for powering the device comprises one or more batteries. In all embodiments the body housing is resistant to temperature increase. Also, in this embodiment the body housing comprises a cylindrical body with a body cover disposed thereon; a cap disposed on an upper end of the cylindrical body; a pair of attachment points diametrically disposed on a lower end of the cylindrical body; and a shell having a plurality of openings disposed proximate to the cylindrical body in a covering relationship.

In a further embodiment the device comprises means for igniting the fire area. In this further embodiment the means for igniting the area to be burned comprises an ignition unit disposed around the body housing and having a plurality of ignition tubes; a control unit configured to receive a wireless ignition signal; a fuse, disposed within each ignition unit, in electronic communication with the control unit; and a flare, disposed within each ignition unit, in contact with the fuse.

In both embodiments the body housing may comprise an attachment guiding structure disposed proximate to the attachment points on the cylindrical body. Particularly, the attachment points enable engagement of the device to a flexible flotation ring, said attachment guiding structure directing attachment thereto.

Also the cap may further comprise a tube extending downwardly from an upper surface of the cap into the cap, said cap configured to receive the means for transmitting/receiving recorded data therethrough. Further still the cap may comprise a fire-resistant compound disposed within the tube.

In all embodiments the means for recording data may comprise a fire-monitoring electronic unit disposed within the body housing at a lower end of the tube and in electronic contact with the means for transmitting/receiving recorded data disposed within the tube. Particularly, the fire-monitoring electronic unit is configured to measure and record temperature of the cylinder body and capacitance between the body cover and the shell. Also in all embodiments the means for transmitting/receiving recorded data may comprise a radiofrequency antenna disposed within the tube and extending exteriorly from the cap. In addition the openings on the shell may be slots disposed in an offset parallel relationship, where the shell is positioned at a proximate distance such that a liquid flows through the slots thereby enabling measurement of capacitance of the liquid. Examples of the liquid may be fresh water, sea water, oil or a combination thereof.

In another embodiment of the invention there is provided a flotation unit for monitoring a burning fire area, comprising a temperature-resistant body housing having a body cover disposed thereon; a cap disposed on a first end of the body housing; a fire-monitoring electronic unit disposed within the body housing; one or more batteries disposed within the body housing; an antenna disposed exteriorly through the cap and in electronic communication with the fire-monitoring electronic unit; and a shell disposed around and proximate to the body cover of the body housing and comprising a plurality of openings on the surface thereof.

Further to this embodiment the flotation unit comprises a pair of attachment points diametrically disposed on a lower end of the body housing and an attachment guiding structure disposed proximate to the attachment points. In another further embodiment the flotation unit comprises a tube extending downwardly from an upper surface of the cap to the fire-monitoring electronic unit, said antenna disposed within the tube. Further to this embodiment the tube may comprise a fire resistant compound disposed within the tube in protective relationship to the antenna. In yet another further embodiment the flotation unit may comprise an ignition unit disposed around the shell having a control unit in electronic communication with the flotation unit; and a plurality of ignition tubes each containing a fuse in electronic communication with the control unit and a flammable material comprising a flare in contact with the fuse.

In all embodiments the fire-monitoring electronic unit comprises means for measuring and recording temperature of the cylinder body and capacitance between the body cover and the shell.

In yet another embodiment of the invention there is provided a system for in situ monitoring of a burning fire area at sea, comprising a plurality of the flotation units as described supra; a first collecting unit, each of the flotation units comprising the plurality in wireless communication with the other flotation units and with the first collecting unit; one or more computers in electronic communication with the first collecting unit; and software applications tangibly stored in the one or more computers comprising processor-executable instructions enabling analysis and display of data received from the first collecting unit.

Further to this embodiment the system comprises a second collecting unit in wireless communication with the plurality of flotation units, where the second collecting unit is in electronic communication with the one or more computers. In another further embodiment the system comprises a plurality of interconnectable, compressible flotation rings, each of the flotation rings comprising attachment rings disposed around the perimeter thereof whereby the flotation rings are interconnected, where the attachment rings are configured to receive the flotation units therein. In this further embodiment a plurality of the interconnected flotation rings may comprise a net securing the flotation units thereto. Also in this further embodiment the net may be compressed and wound around a reel for subsequent deployment at sea.

In yet another embodiment of the invention there is provided a for in situ monitoring of burning oil in real time, comprising the steps of deploying the net comprising the plurality of the flotation units of the system described supra onto an area of an oil slick; activating the flotation units; igniting the area of oil slick; recording in real time a position of each flotation unit and the temperature and capacitance data at each of the flotation units disposed within the burning area; and wirelessly transmitting the recorded data to first and second collecting units and thereby to computers electronically linked thereto for monitoring of the data. In all embodiments the step of activating the flotation units may comprise activating the electronic units within the flotation units and registering the flotation units with the first and second collecting units.

Further to this embodiment the method comprises calculating distance between flotation units and surface area of the burning oil via software tangibly stored in a computer memory. In another further embodiment the method comprises video monitoring the burning area and displaying the video in real time with the transmitted recorded data.

This invention discloses a system and methods for monitoring, recording and calculating the surface area of a fire over the area of the burn, in open sea. The monitoring system comprises means for collecting, monitoring and storing/retrieving data related to surface area of the burn including temperature at multiple locations, and for wirelessly communicating the data. A preferred application of the in situ monitoring system is to monitor the in situ burning of an oil patch or oil spill.

Generally, the monitoring systems described herein encompass means for deploying the system safely without the necessity of a surveillance plane or the VHF communications between the surveillance plane and the vessel fleet. Also, the instant in situ monitoring system eliminates the spotter required to direct the burn team to the thicker burnable oil, indicating readiness for igniting the oil, and confirming that the fire it out. The in situ monitoring system comprises means for monitoring the surface area via image/video feed as close to continually as possible and to "see" through the dark smoke of the burn. In addition, the instant in situ monitoring system provides improved means for documenting burn event details, such as who, when, where, operating conditions, area of burn, in which this data is recorded and orthocorrected accurately. This eliminates manual calculation, for example, of the burn volume or total volume of oil burned over time, which must be estimated as accurately as possible.

This in situ fire burning monitoring system comprises submersible devices or flotation units floating in water where each individual device or submersible flotation unit may operate independently or concomitantly with one or more other submersible flotation units with which it communicates wirelessly. Generally, the flotation unit comprises a watertight high-temperature mechanical enclosure having an electronic unit with firmware/software drivers and a means for powering the unit, for example, one or more batteries.

Particularly, communication is via wireless radio frequency with a plurality of units connected to computers installed in proximity. The submersible flotation unit measures the temperature at its location, the electric capacitance of the fluid at its location, and the distance between its position and every other flotation unit it establishes wireless contact with. Each flotation unit processes and stores this data in its memory and transmits it to other units that retransmit it until it reaches the main control unit connected to a computer. The computer runs an application in which algorithms process the received data. The processed data is utilized to draw heat maps, oil patch thicknesses, with calculation of surface areas and other factors.

The monitoring system also comprises means for maintaining close proximity of the flotation units in the oil spill or slick. A flexible net comprises a plurality of floating flexible interconnectable rings. The rings may float on the water surface or at a submerged depth of about 3 inches. Each ring has means for carrying one or more flotation units connectable thereto such that the all the flotation units move simultaneously within a boom as it is towed by the boats.

Optionally, the monitoring system may comprise means for igniting the fire area that is to be burned. An ignition unit is disposed around one or more of the submersible or flotation units and is in electronic communication with the same via a control unit. The ignition unit comprises a plurality of tubes containing a flammable material, such as a flare, for igniting the fire. The flammable material may be ignited via an ignition means, for example, a fuse, in electronic communication with the control unit.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 is an exemplary in situ monitoring system. Boat 1a carries the primary computer 2a, comprising a first processing unit, electronically linked at 2b to primary collecting unit 4a and boat 1b carries the secondary computer 2c, comprising a second processing unit, electronically linked at 2d to secondary collecting unit 4b. The collecting units 4a,b communicate with the flotation units 6a,b,c, which relay communications one to the other, via radio waves at 5a,b, c,d. While only three flotation units are depicted for a simpler overview, the in situ monitoring system can accommodate, but is not limited to, about 225 flotation units.

The main unit 4a contacts the flotation units 6a,b,c, collects wireless information from each unit, and sends the data via the electronic link 2b, such as a USB cable, to the software application running on the computer 2a. The secondary unit 4b and the secondary computer 2c work concurrently to establish a redundant data collection and processing mechanism to that of primary unit 4a and computer 2a.

The flotation units are light weight and may have dimensions of about 6 inches in length×2 inches in width. Each of flotation units 6a,b,c comprise an upper portion 7a,b,c which is disposed above the water line 8 and a lower portion 7d,e,f which is submerged beneath the water line.

Each of flotation units 6a, 6b and 6c comprise firmware/software drivers (not shown) and are capable of collecting data such as temperature, pressure, resistivity, capacitance, thickness of the oil patch and other measurements, of processing and storing this data in memory and of retrieving/transmitting/receiving the data via radio frequency carrier waves to other units and to the collecting units 4a,c.

The data collected in real time enable the algorithms of the software application running on computers 2a and 2c to calculate the fire's location based on the elevated surface temperature, the fire's surface area knowing the distance between the units recording an elevated temperature, and the time the fire kept burning. The software application stores the calculated information on file, which can be imported into, for example, .csv format for Excel, on the computer for later offline analysis and transmission. Optionally, the results of the data calculations may be wirelessly streamed to one or more other locations.

Boats 1a,b are attached independently to one end of the boom cable 3 that encircles an area of oil spill to be burned and contains the plurality of units represented by flotation units 6a,b,c deployed within the U formed by the boom when in tow. Each unit transmits wireless data on temperature, location, thickness of oil patch, and the distance between its position and the other units before and after ignition of the oil within the boom and may be spread in large quantities over a sizeable area. The higher the deployment density the greater the precision of the surface calculations.

Figure 2:
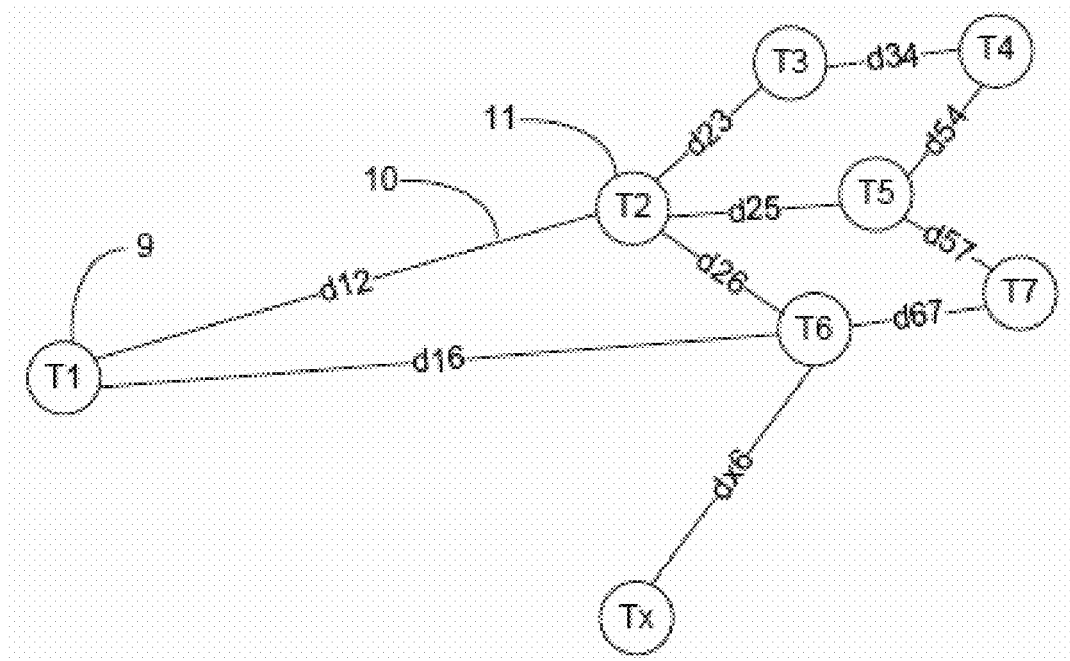
FIG. 2 is a schematic depicting the wireless connectivity among flotation units for distance and temperature pairs (d,T) measured in the system.

FIG. 2 is a connectivity diagram that demonstrates the general relationship between flotation units for data measurement and communication within the in situ monitoring system. Flotation units, represented by flotation units 9 and 11, are paired where the representative distance d (not to scale) between two flotation units is provided along with each flotation unit's location temperature T. Flotation unit 9 measured the temperature noted T1 at its location and communicated with flotation unit 11 which allowed it to calculate the distance at 10 separating the two units noted as d12. The temperature notation Tx indicates that the in situ monitoring system may comprise a variable number of flotation units each able to measure temperature and communicate at a distance with other units. Units 9 and 10, as representative of any flotation unit, also measure and transmit the thickness of the oil at their respective locations based on the capacitative characteristics of oil and water.

Figure 3A:
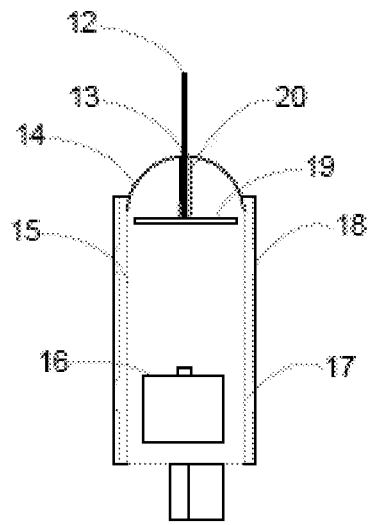
FIGS. 3A-3B are a cross-sectional view (FIG. 3A) and an exterior view (FIG. 3B) of a submersible flotation unit.
Figure 3B:
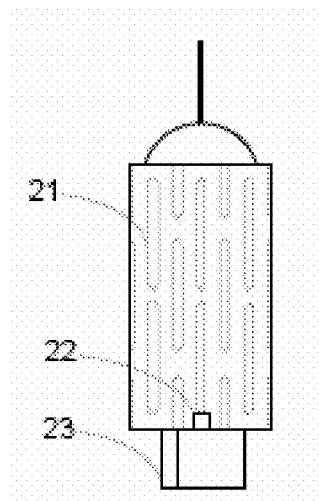

FIGS. 3A and 3B are cross-sectional and exterior views of the submersible flotation unit. FIG. 3A shows a hermetic, flotation unit 6a comprising a metal cap 14, which may be a hollow cap and may comprise copper or stainless steel, a cylindrical body housing 15, and an external shell 18. The body housing can withstand a temperature of about 85° C. which is the estimated temperature at a depth of about 6 inches. A metallic antenna, for example, but not limited to, a ¼ wavelength straight radiofrequency antenna extends exteriorly from the cap 14 through a tube 20 with fire-resistant compound 13 in between, such as, but not limited to porcelain. The antenna extension increases the distance to the surface of the oil spill to decrease splashing thereof by the burning oil which becomes very agitated during burning. The housing body 15 houses one or more batteries 16 and electronic unit or board 19 in contact with the antenna 12 and tube 20. The electronic unit measures the temperature of the cylinder 15, the capacitance between the body cover 17 and the shell 18, which is utilized to estimate the depth of the oil spill. It also receives wireless signals from other units and measure the distance between its location and each unit. The unit transmits the total data collected and processed to the main unit that send it to the computer application for further processing. Optionally, the electronic unit may comprise a GPS capability.

FIG. 3B shows the shell 18 surrounding the flotation unit 6*a*. A plurality of openings or slits, represented by slit 21, are disposed in an offset pattern parallel to the longitudinal axis through the flotation unit. The plurality of slots permit the floating liquid on top of the water surface to flow in-between the shell 18 and the exterior or body cover of the housing body 15. The fin 23 in the bottom of the flotation unit 6*a* guides or directs the unit and pulls it in one direction when the unit is pulled from the attachment point 22 on the housing body. Each flotation unit has 2 attachment points disposed on opposite sides of the unit body for attachment to a ring 28 comprising a net (see FIG. 5).

Figure 4A:
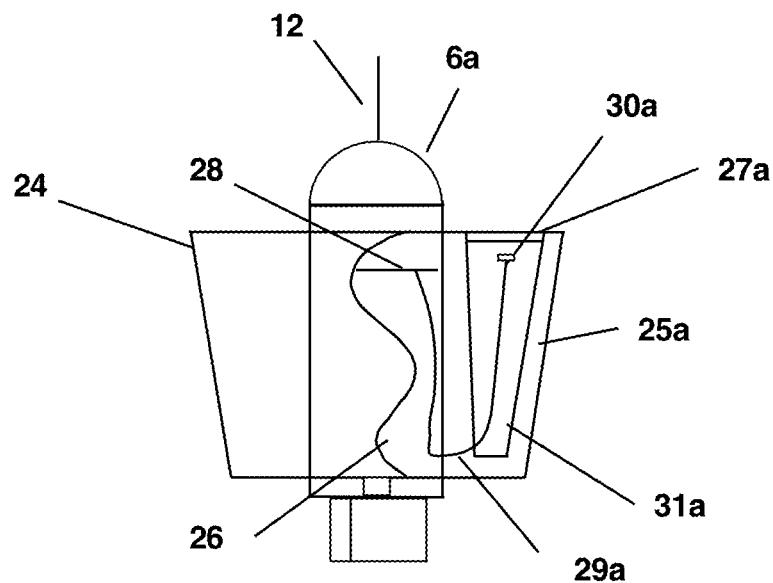
FIGS. 4A-4B are a cross-sectional view (FIG. 4A) and a top view (FIG. 4B) of the ignition unit disposed around the submersible flotation unit.
Figure 4B:
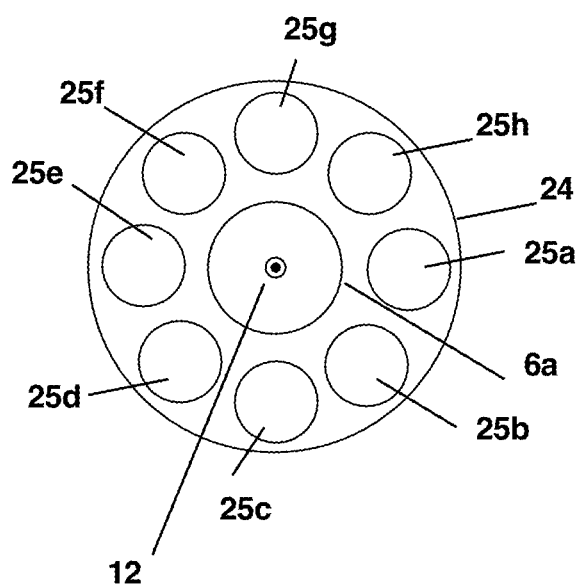

FIGS. 4A and 4B are cross-sectional and top views of the ignition unit. FIG. 4A illustrates in cross-section at 26 one of the plurality of ignition tubes, for example, but not limited to eight ignition tubes 25*a-h*, comprising the ignition unit 24 (see FIG. 4B). The ignition unit 24 is an outer body disposed around the submersible flotation unit 6*a*. For example, the ignition unit may be a cylindrical body with the eight ignition tubes disposed circumferentially therethrough. The ignition tubes have an open upper end into which a plug 27*a* is disposed. Each ignition tube, as represented by 25*a*, comprises a flammable material 31*a*, for example, but not limited to, a flare or flare material, that generates sufficient heat to ignite the oil on the water surface.

Particularly, when the ignition unit receives a wireless signal, via antenna 12, a control unit 28 sends an electrical signal via one or more wires, as represented by 29*a* to a fuse 30*a* causing it to flame or blaze and thereby ignite the flare or flare material 31 disposed within the ignition tube of the ignition unit. The ignited flare produces a flame for about 15 seconds, the heat from which ignites the oil patch around the submersible flotation unit. The ignition unit can ignite the flares separately or simultaneously.

FIG. 4B depicts the disposition of the ignition unit around the submersible flotation unit from a top perspective. Generally, the substantially cylindrical ignition unit 24 encircles the submersible flotation unit 6*a*. The ignition tubes 25*a-h* therefore are similarly disposed around the submersible flotation unit.

With continued reference to FIGS. 1 and 3A-3B, FIG. 5 shows a ring 37 joining 2 flotation units 6*a,b* by slotting the units into the ring at ring attachment points 34 and 36. The ring is flexible and interconnectable with other rings via any of ring attachment points 33,34,35,36 to form a net 42 (see FIG. 6). With a diameter 35 of 10 feet the surface area of the ring is about 78 square feet.

Figure 5:
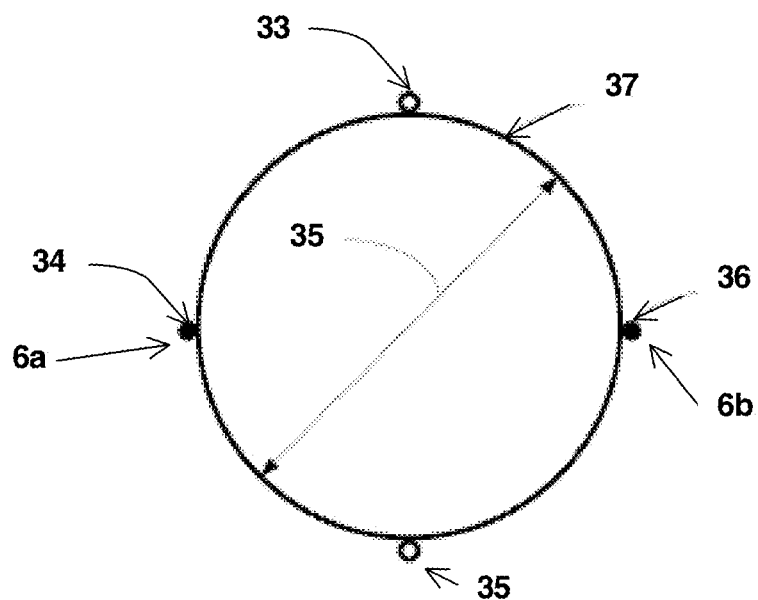
FIG. 5 depicts a single ring comprising a net for connecting the submersible flotation units of FIGS. 3A-3B.
Figure 6:
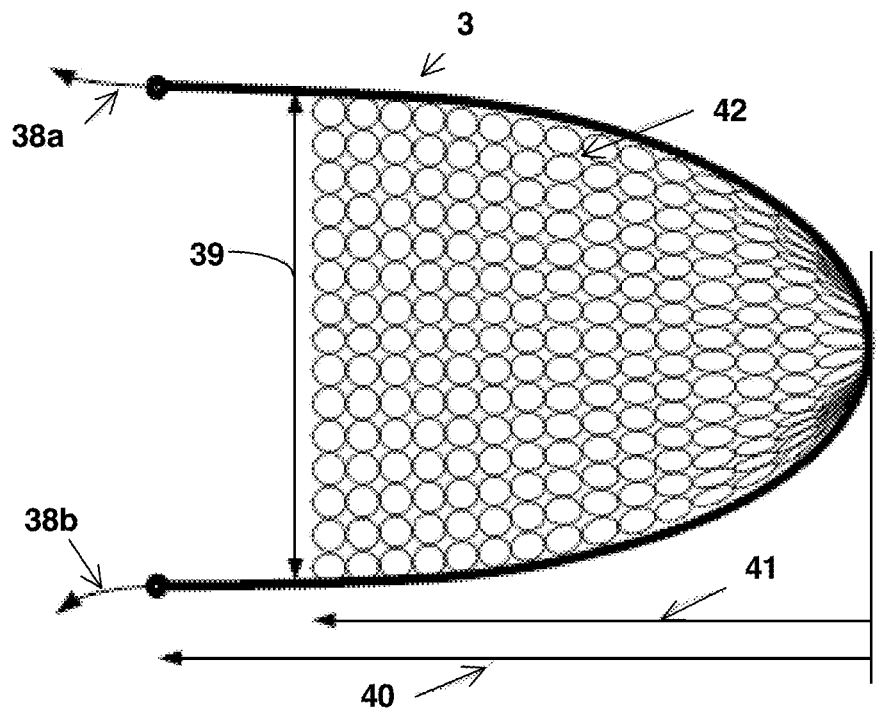
FIG. 6 depicts a complete net disposed within a fire boom
Figure 7A:
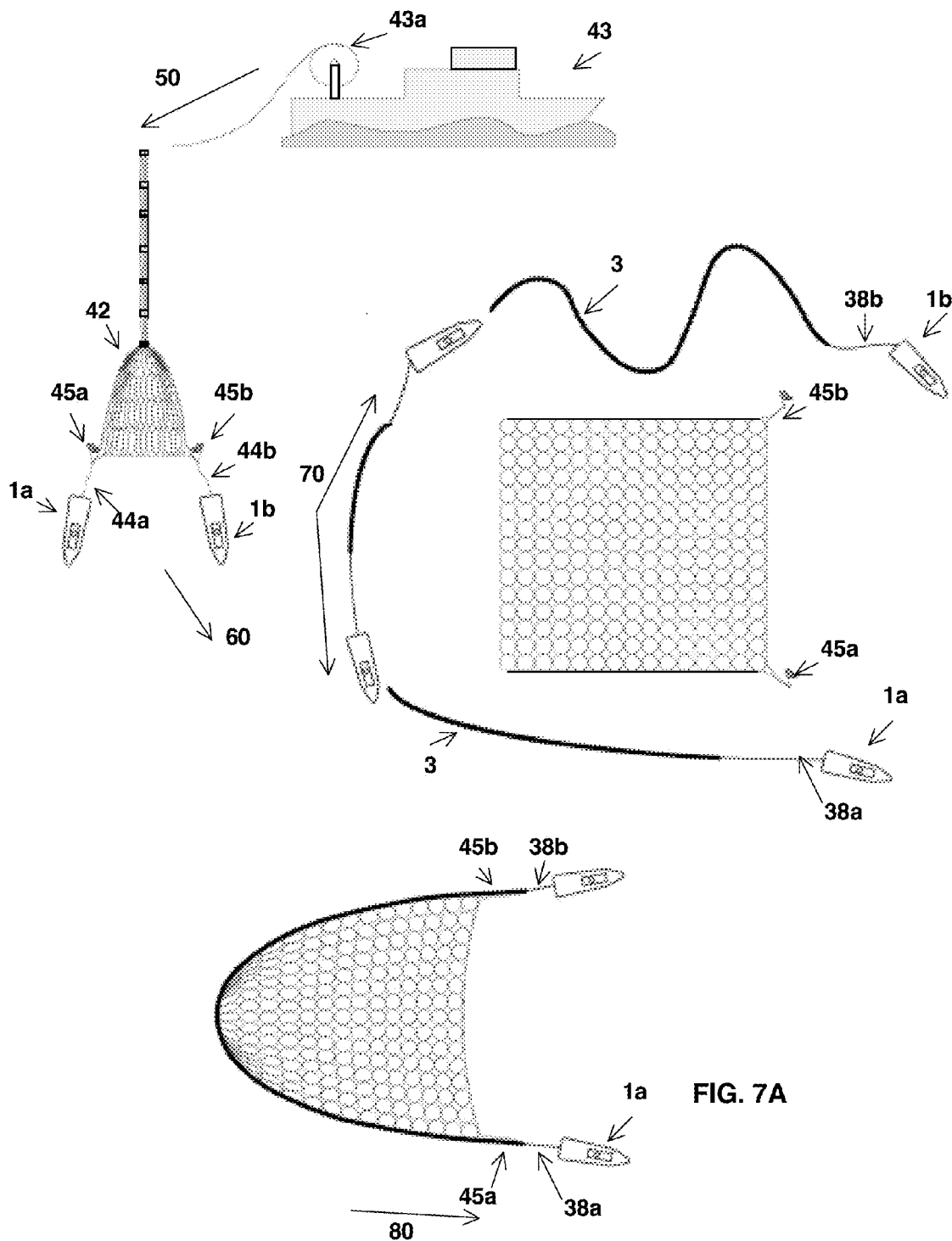
FIGS. 7A-7C illustrate alternate deployment methods of the in situ fire burning area monitoring system at sea.

With continued reference to FIG. 5, FIG. 6 shows 225 rings attached together via the respective ring attachment points 33,34,35,36 (see FIG. 5) to form a flexible, compressible net 42 covering 20,000 square feet within the U formed by a bell shaped boom 3, such as a fire boom, of about 500 feet of length. The net may be dragged by lines or cables 38*a*,38*b* attached at the ends of boom 3. The distance 40 is about 220 feet whereas the distance 41 is 171 feet at an opening 39 of about 149 feet (see FIGS. 7A-7B).

With continued reference to FIGS. 1, 5 and 6, FIG. 7A illustrates deployment of the flexible net at sea. At step 50 the compressed, flexible net 42 comprising the plurality of flotation units attached thereto is deployed into the sea from a reel 43*a* on a ship 43. The net may be packaged a reel with dimensions of 4×4×5 feet and weighs about 60 lbs to about 80 lbs The flexible net is dragged to full expansion in water by boats 1*a,b* attached to the net by cables 44*a,b* and marked by flags 45*a,b* at step 60. The boats drag the boom 3 by cables 38*a,b* around the fully expanded net 42 to encircle it at step 70 to form a U-shaped configuration. At step 80 the net is attached to the boom by cables 44*a,b* and is moved forward by the boom attached by cables 38*a,b* to the boats 1*a,b* as the boom is pulled by the boats.

Figure 7B:
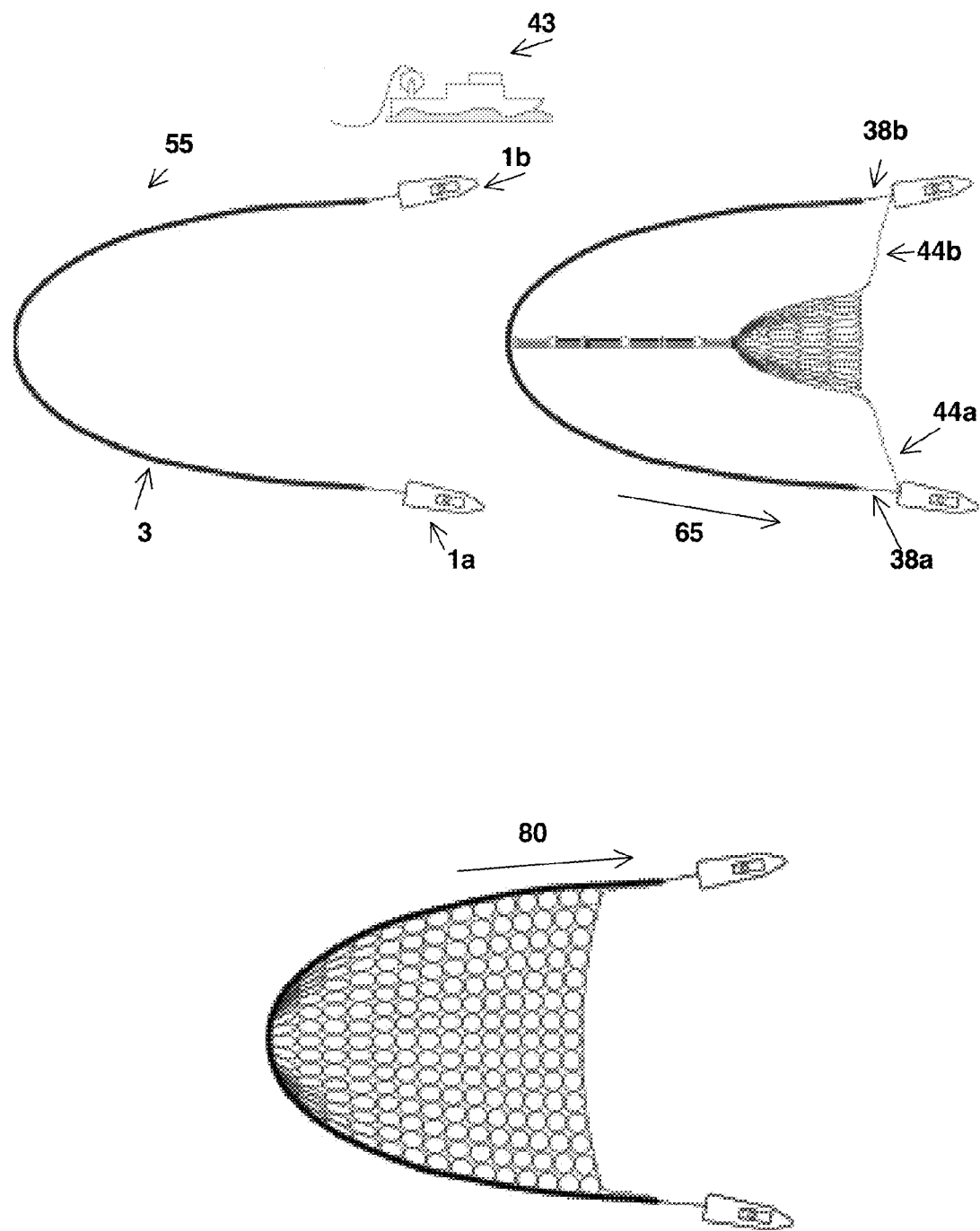

FIG. 7B illustrates an alternative deployment method where the net is deployed in the water from one of the towing boats. At step 55 the boom 3 is deployed into the water from the ship 43 and connected by cables 38*a,b* to the boats 1*a,b* to form a U-shaped configuration. The flexible net 42 is deployed from one of the boats 1*a,b* and attached by cables 44*a,b* to the deployed boom at step 65. As the boats move forward dragging the boom, the net becomes fully deployed as in step 80 in FIG. 7A.

Figure 7C:
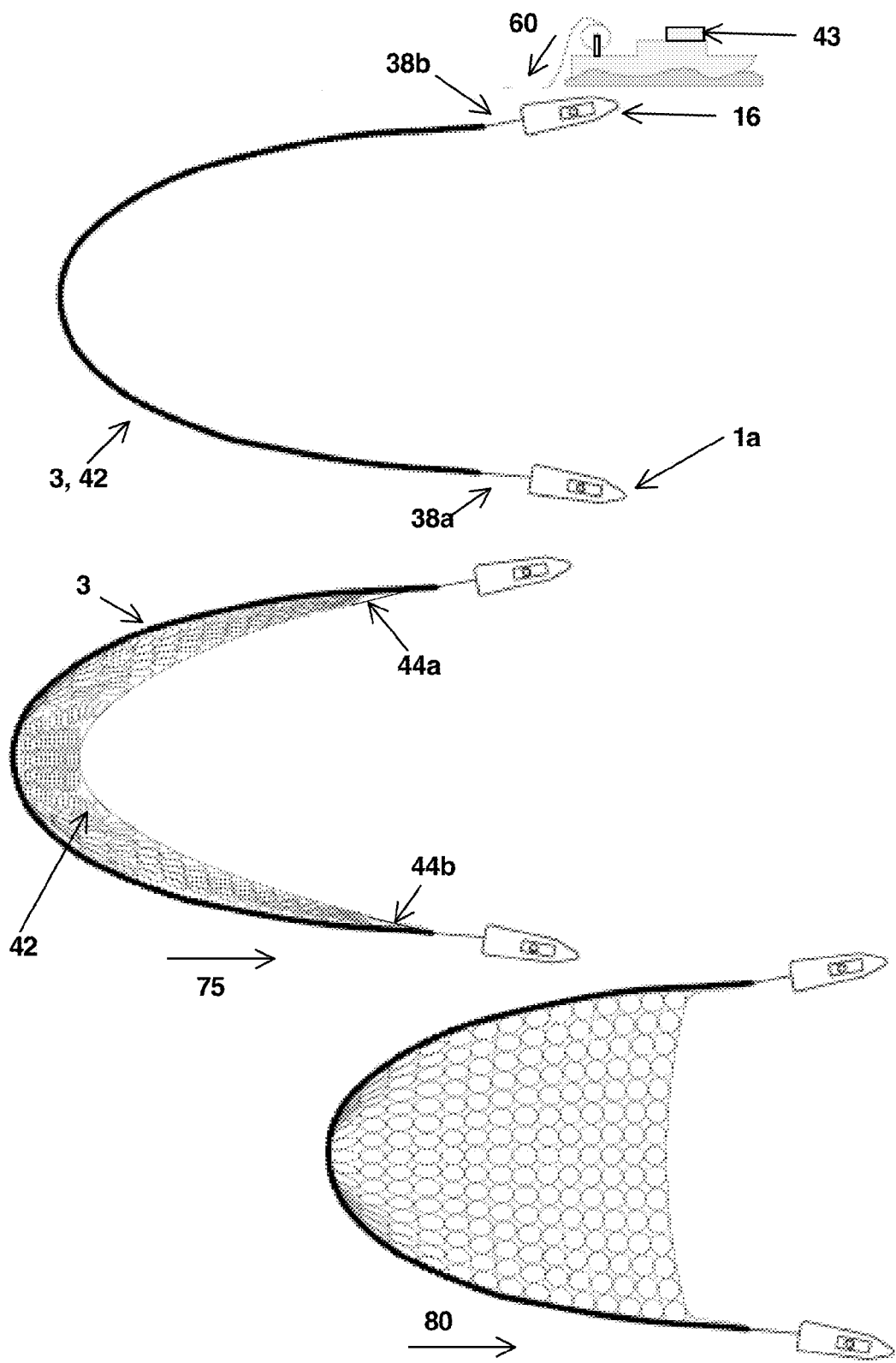

FIG. 7C illustrates another alternative deployment method where the net is integrated with the fire boom. At step 70 the boom 3, with the flexible net 42 compressed and integrated therewith, is deployed into the water from the ship 43 and connected by cables 38*a,b* to the boats 1*a,b* in a U shape as shown in FIG. 7B. As the boats pull the boom at step 75, the flexible net begins to decompress until the flexible net is fully deployed within the boom at step 80. Cables 44*a,b* attach the flexible net to the boom.

Once the flexible units touch the water, the electronic unit 19 activates and registers with the primary 4*a* and secondary 4*b* collecting units. The net in such deployment is able to cover the largest area inside the boom, taking into consideration the need to be a flexible system. For example the net will have to adjust its shape in rough seas and high winds while maintaining its integrity and functionality.

Figure 8:
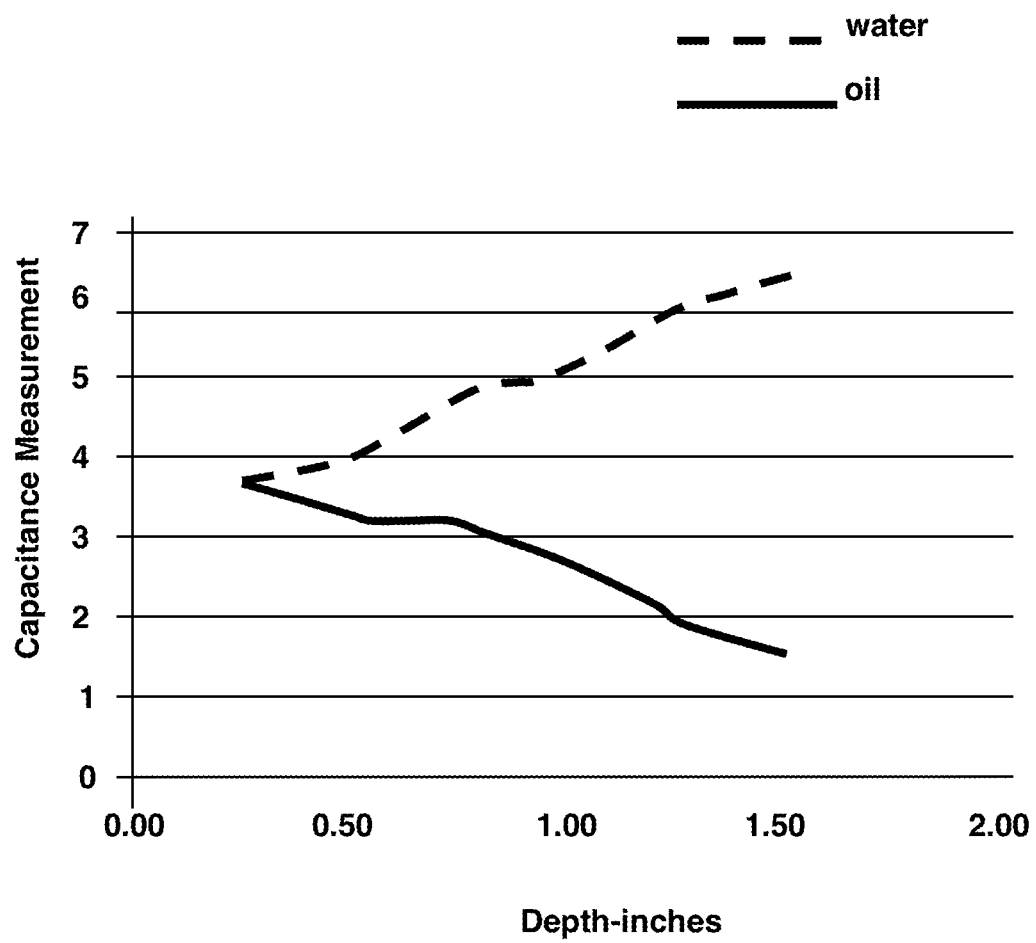
FIG. 8 compares the capacitance measurements made by a flotation unit at various depths.

FIG. 8 is a graph of oil patch thickness readings obtained from a flotation unit based on capacitance readings in water and oil obtained from a flotation unit. The graph is based on the readings in Table 1.

TABLE 1

| Depth (in) | Measurement reading in water | Measurement reading with oil patch water |
|---|---|---|
| 0.25 | 3.75 | 3.67 |
| 0.50 | 4.05 | 3.28 |
| 0.75 | 4.86 | 3.15 |
| 1.00 | 5.26 | 2.65 |
| 1.25 | 5.94 | 1.95 |
| 1.50 | 6.34 | 1.5 |

It is demonstrated that the readings are precise and can be extrapolated to $1/32$ inches resolution for depths ranging from about 0.25 inches to about 3 inches.

Figure 9:
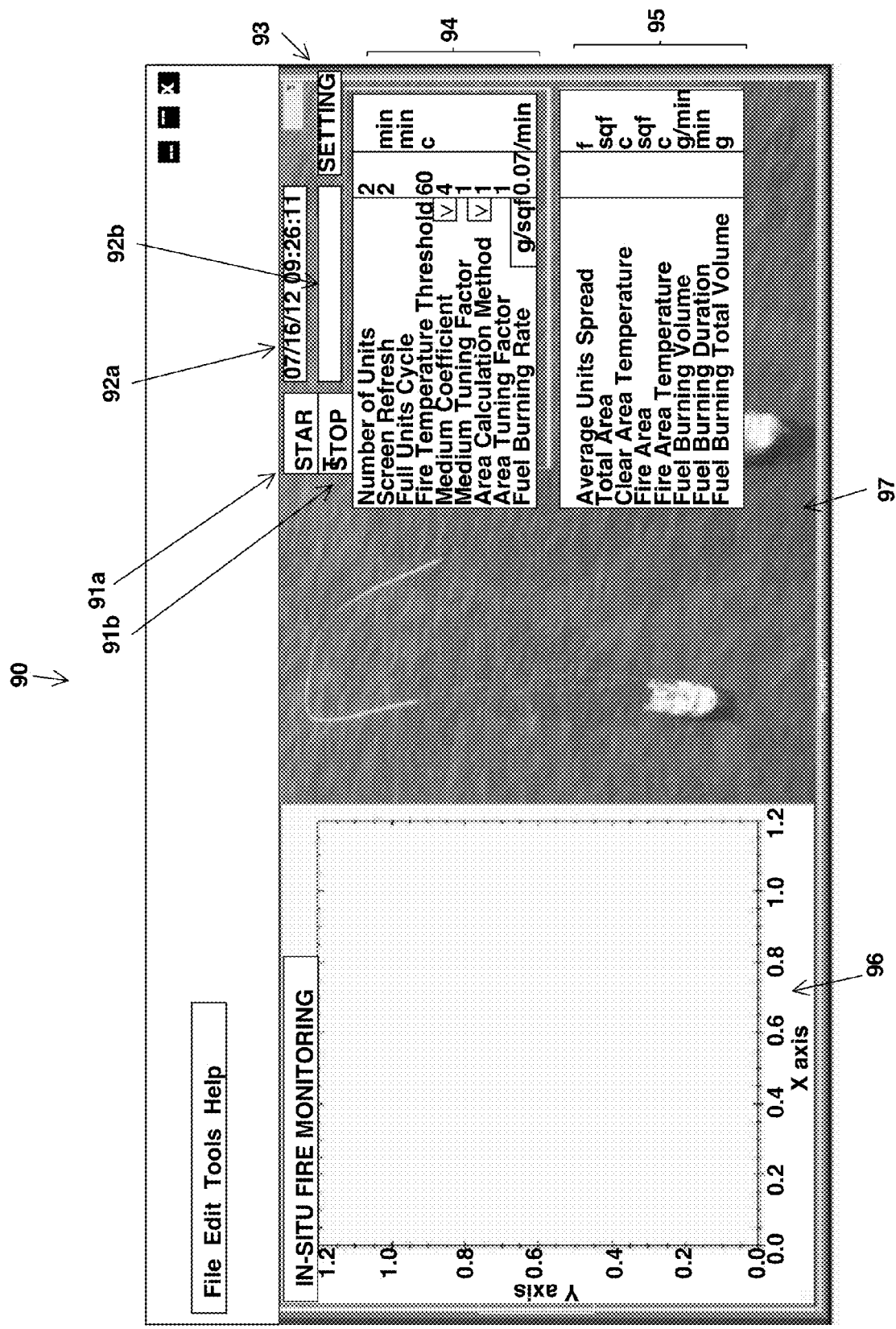
FIG. 9 depicts the computer software application for the in situ fire burning area monitoring system.

FIG. 9 depicts a screenshot 90 of the software application. The controls are located on the right hand side with buttons to start 91*a* and stop 91*b* the application along with time stamps 92*a,b*. The Settings button 93 activates the configuration data block 94 which displays the number of units, screen refresh rate, full units cycle, fire temperature threshold, medium coefficient, medium tuning factor, area calculation, method, area tuning factor, and fuel burning rate. These text fields are editable. The operation data block 95 displays the average distance of units spread, total area, clear area temperature (non-burning), fire area, fire area temperature, fuel burning volume, fuel burning duration, and total volume of burned fuel. A graph overlay 96 is at the left hand side of the screen and is dedicated for presenting the location of the units relative to each other (Cartesian plot). Additional menus may be added to save and upload the collected and calculated data shown in the configuration and operation data blocks in an Excel compatible format.

In this representation the background 97 may depict a picture still captured from the in situ monitoring operation, such as herein showing a boom dragged by 2 boats in clear water. Alternatively, a video feed, also represented by 97, may be inserted on the screen to replace the still background picture. The video feed functions to capture, save, playback in sync with the system data. This provides easier analysis and review of the results and conditions of the fire. Moreover, the video feed may display recorded videos of the fire.

Figure 10:
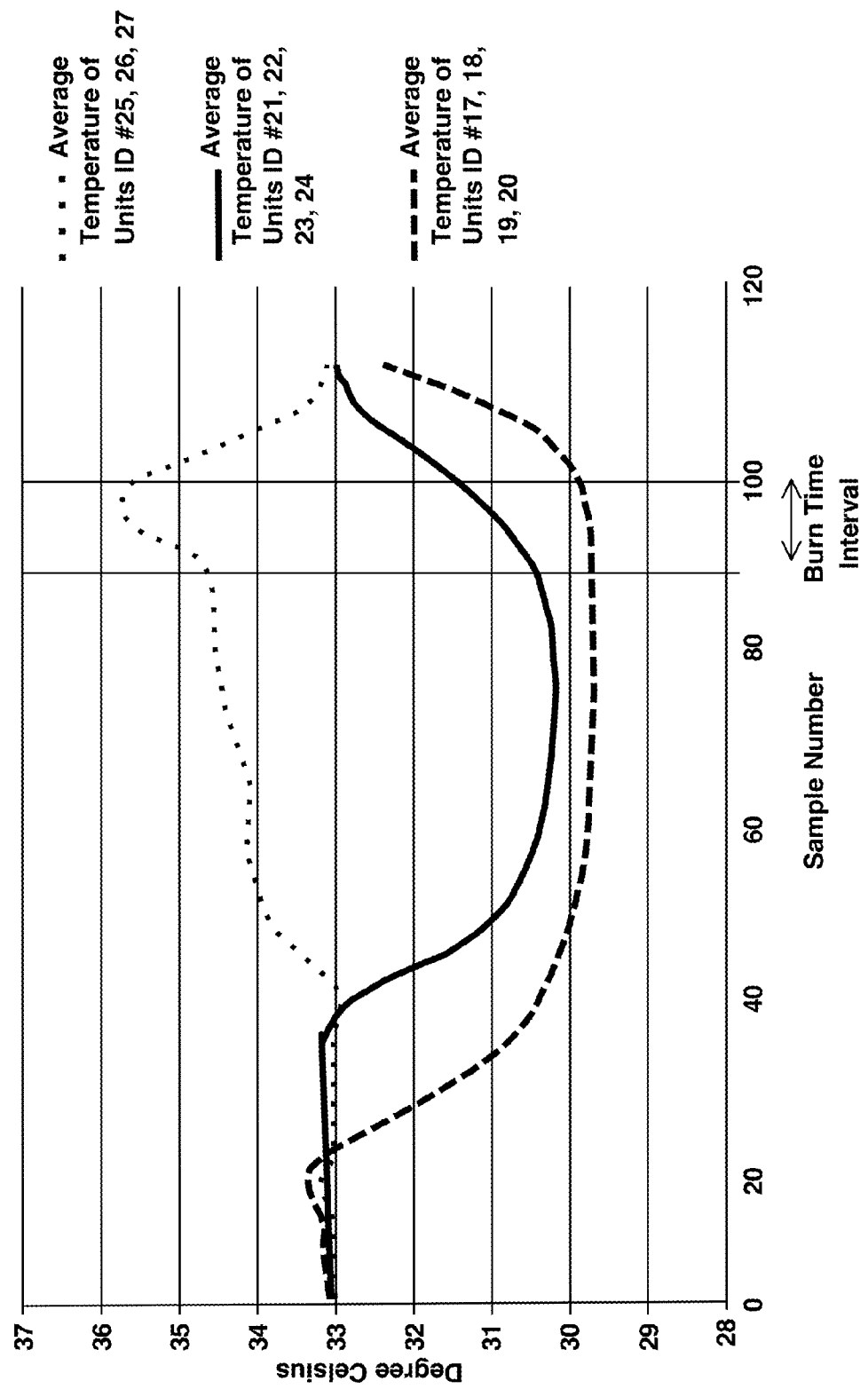
FIG. 10 is a temperature graph depicting the temperatures reported by each of 11 flotation devices at each sampling point.

FIG. 10 demonstrates the ability of the flotation unit to measure temperature at its location and communicate the measurements to the collecting units 4a,4b. Flotation units were pre-tested in a water tank containing burning oil and a tank containing clear water. The units collected from the clear area of the pool showed no sign of heat damage as expected. All units were functioning properly during the burn and after they were recovered from the water tank. The units pulled from the fire section of the pool were covered with a thin coat of black smoke, but were fully functional and the body housing didn't exhibit any signs of damages or stress. It was noted that the flotation units in the fire tended to move closer to each other from the positions in which they were floated originally. Moreover, the primary collecting unit remained functional during the burn.

The system was setup to start the communication between the main unit and the flotation units before submersing the respective units in the pool. FIG. 10 consolidates the temperature information collected from all the units over the duration of the data collection. The X axis represents the number of samples and the Y axis represents the value of the temperature in degree Celsius. The series are titled per the respective unit identification number. Sample 1 started at 10:11:23 and sample 110 stopped at 10:36:44. There are about 14 seconds between each sample and the total data collection time is about 25 minutes and 21 seconds.

All the units were setup and configured on the table close to the pool. The system ran for around 18 samples (~4 minutes) reporting an ambient air temperature of about 33 degree Celsius before the units identification numbers' 17, 18, 19, and 20 were placed first in the pool. The temperature measured by these units showed a drop of more than 3 degree off the ambient temperature as shown by the dip in the lowest bold line. Units 21, 22, 23, and 24 were placed in the other side of the pool a few minutes later and displayed a similar behavior with a temperature dip of 3 degrees. Units 25, 26, and 27 left outside the pool on the floor but in close proximity to the pool measured a gradual increase in their temperature facing direct sun and on cement floor. At 10:32:02 the system starts detecting an increase in temperature with different gradient corresponding to the group location. The units outside the pool received the heat radiation of the fire and reported the elevation of the temperature almost instantly. The units under the fire-water surface detected the raise in the water temperature softly whereas the units in the clear side did not react to the fire during the fire burn, but showed the elevation of the water's temperature gradually as the whole pool water was stabilizing.

Figure 11A:
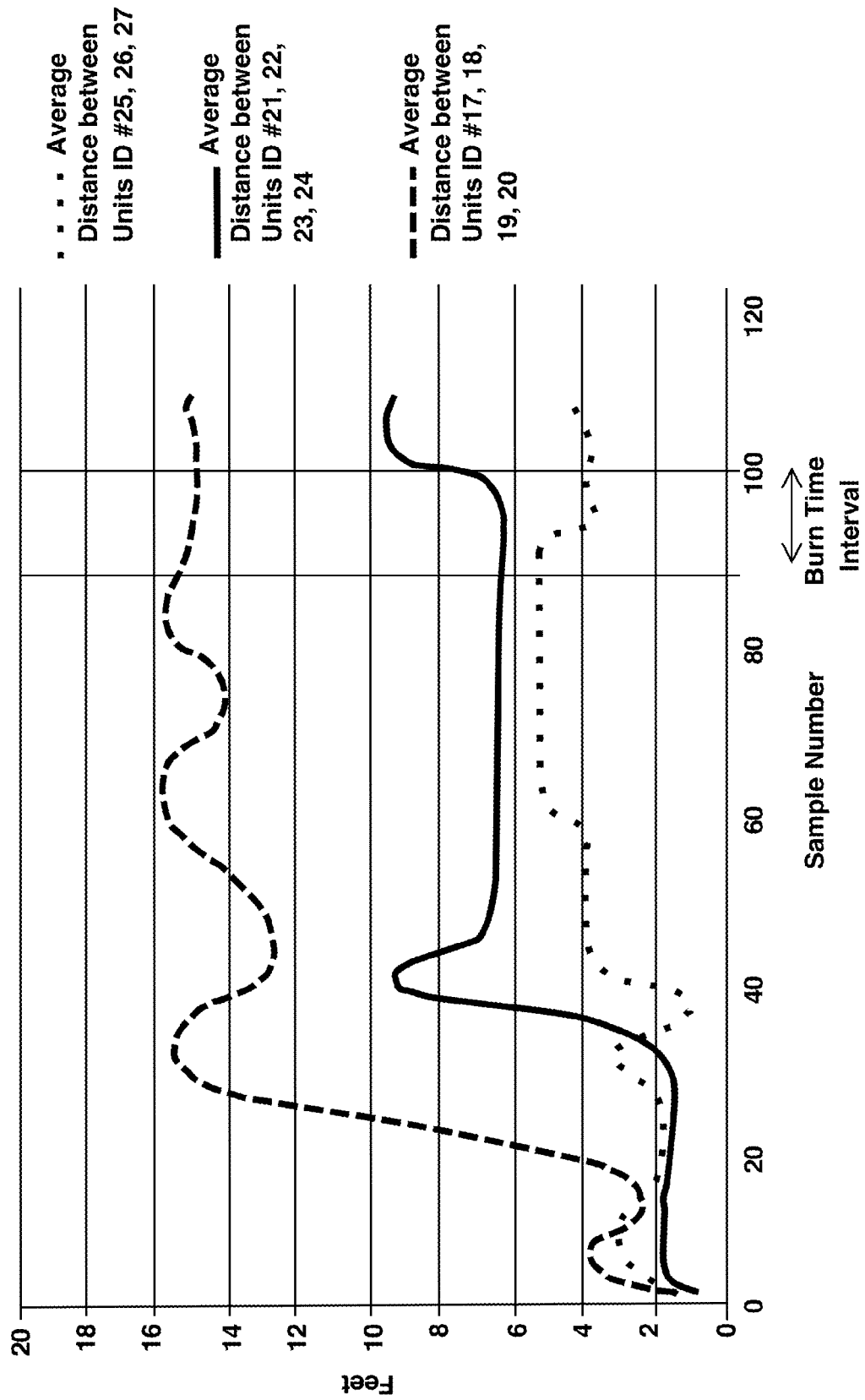
FIGS. 11A-11B are a distance graph and a distance graph corrected for the medium, respectively, depicting the position reported by each of 11 flotation devices at each sampling point.
Figure 11B:
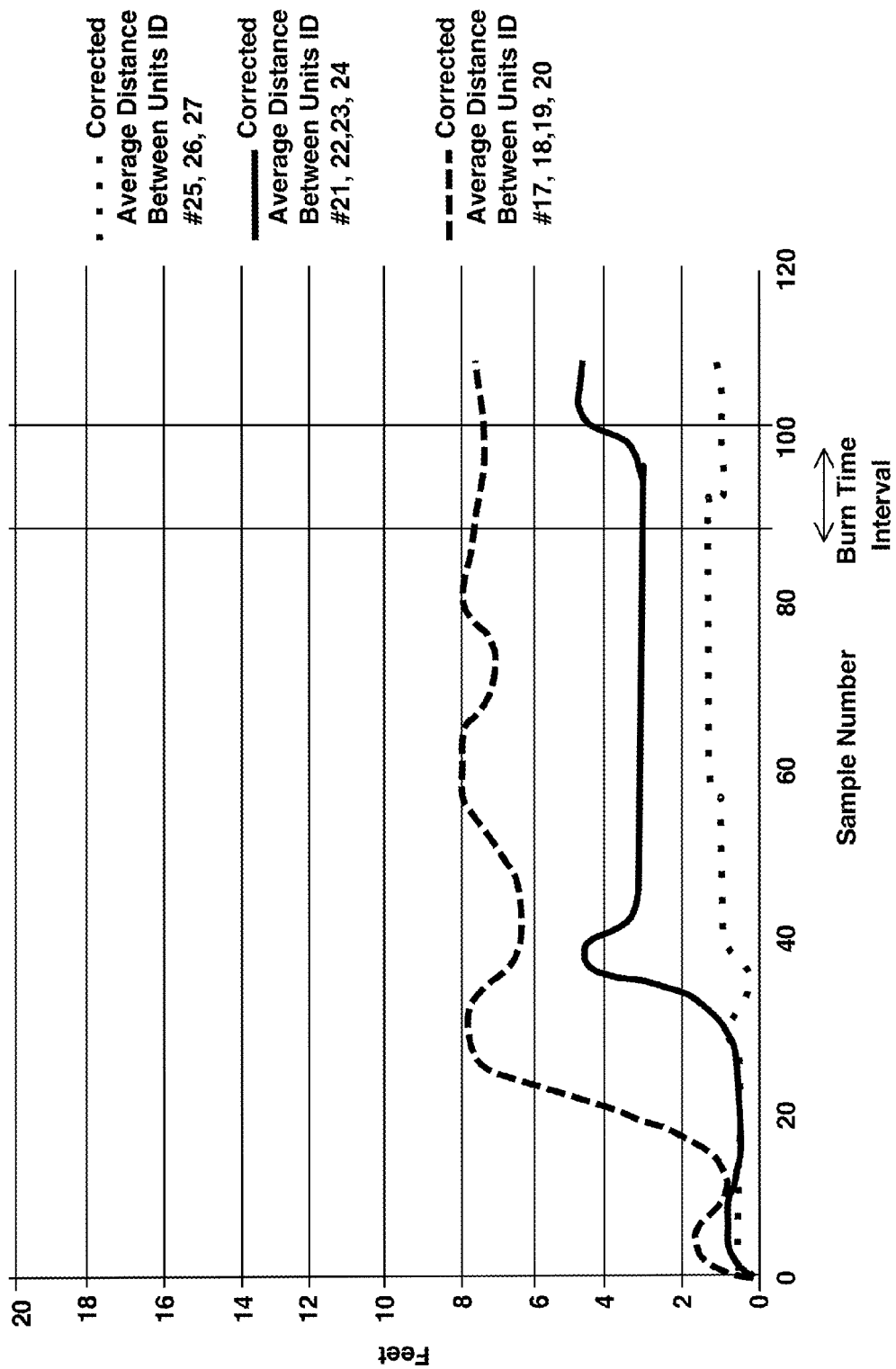

FIGS. 11A-11B demonstrates the ability of the flotation unit to communicate its position to the collecting units. All units reported their positions. FIG. 11A summarizes 3 averages for distances calculated for the 3 unit groups above. The X axis represents the sample number and the Y axis represents the distance in feet. For the 4 minutes of the test the units were all on the table besides the pool with an average distance from each other about 1 feet. Units 17, 18, 19, and 20 were taken apart and plunged in the pool as was done in FIG. 10. The distances between these units were kept stable throughout the test. Units 21, 22, 23, and 24 were spread apart and plunged in the pool section dedicated for the fire. At first the distances were suppose to be similar to the other side of the pool but the wind and accumulation of the oil in one corner of the pool (as described earlier) forced the test team to move the units to that corner and reduced the average distance between the units. This is shown by the middle bold line in FIG. 11A. The units placed on the cement floor to the side of the pool were not far apart and reported a constant average distance. This later shows minor fluctuation due to the rolling of one of the units on the ground. The distances reported by the units and compiled by the software application running on the computers and displayed in FIG. 11A are not calibrated as the "Settings" were left to the default ones.

FIG. 11B depicts corrected distance incorporating the Medium factor. This validates the tuning factor for the "Medium", i.e., the place where the electromagnetic flow past and the "Area" calculation. FIG. 11B reports distances with a medium factor of 6, instead of the default value of 4. The average distance within each group of units matching the test finding. Units 17, 18, 19, and 20 were about 6 feet apart on average. Units 21, 22, 23, and 24 were much closer to each other squeezed in the fire corner at 3 feet from each others. The units on the ground were about 1 foot apart.

An application offline re-run of the collected data files validated the results. The reported results on the application screen demonstrate that the overall average of distance spread between all units estimated to be 4.7 feet, the total area covered by all the units of 189 square feet, the clear area water temperature of 30 degree Celsius, the temperature of water in the fire area was averaged to 31.4 degrees, the fire area estimate is close to 51.6 feet; and the burning volume of oil estimate is about 3.6 gallon per minute for the duration of burn. Knowing that the burn lasted for 3 minutes the estimated amount of oil burned is about 11 gallons.

Figure 12:
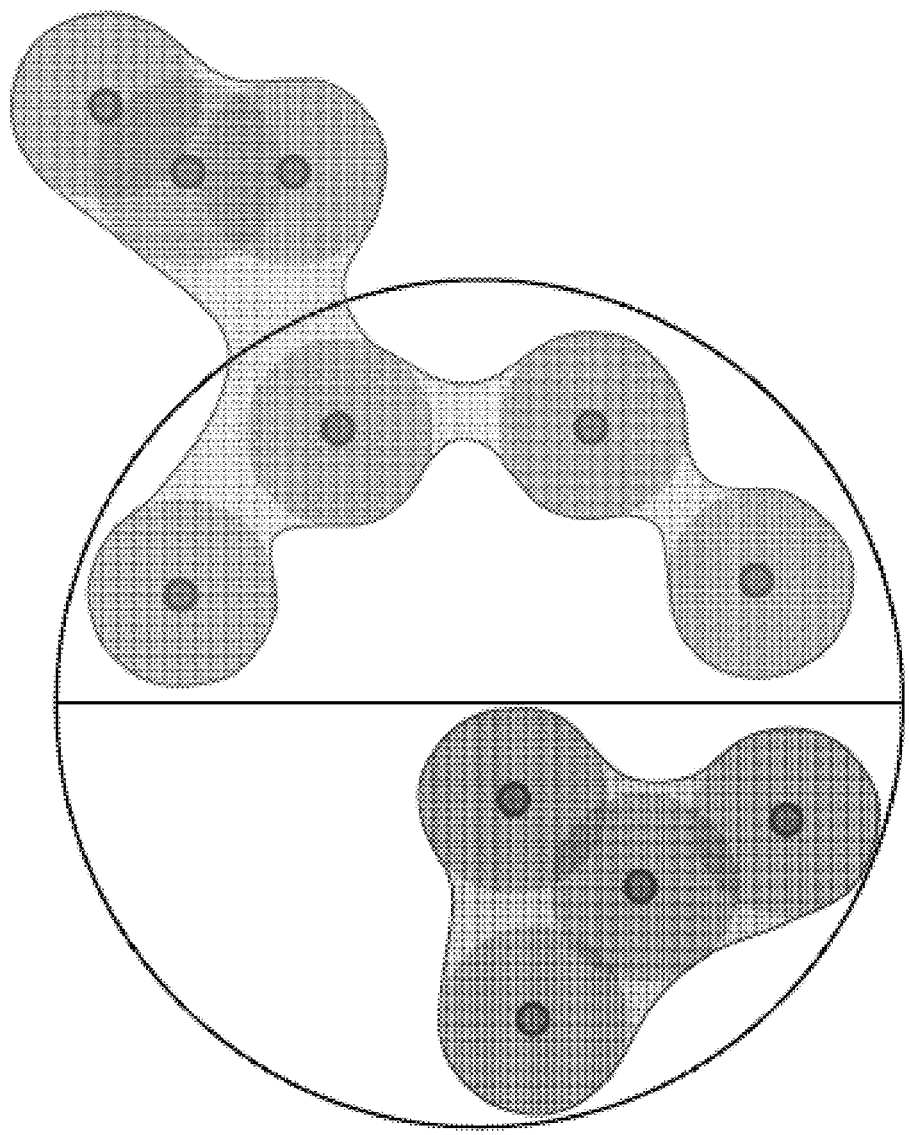
FIG. 12 is a heat map of the burn performed in FIGS. 10 and 11A-11B.

FIG. 12 displays a heat map during the fire burn. The heat map uses half of the average distance between the units, 4.7 feet, as an equal-heat radius around each unit. The total surface is calculated to be about 190 square feet and the fire area is calculated to be about 56 square feet. The left half of the water tank represents the burn area and the right half represents clear water only. The area outside the tank is the concrete floor on which the tank sits.

One skilled in the art will readily appreciate that the present invention is well adapted to carry out the objects and obtain the ends and advantages mentioned, as well as those inherent therein. It will be apparent to those skilled in the art that various modifications and variations can be made in practicing the present invention without departing from the spirit or scope of the invention. Changes therein and other uses will occur to those skilled in the art which are encompassed within the spirit of the invention as defined by the scope of the claims.

What is claimed is:

1. A device for monitoring a burning fire area, comprising:
a body housing having:
a cylindrical body with a body cover disposed thereon;
a cap disposed on an upper end of the cylindrical body and comprising a tube extending downwardly from an upper surface of the cap into the cap;
a pair of attachment points diametrically disposed on a lower end of the cylindrical body;
an attachment guiding structure disposed proximate to the attachment points on said cylindrical body; and
a shell having a plurality of openings disposed proximate to the cylindrical body in a covering relationship;
a radiofrequency antenna disposed within the tube and extending exteriorly from the cap;
a fire-monitoring electronic unit disposed within the body housing at a lower end of the tube and in electronic contact with the radiofrequency antenna; and
means for powering the device.

2. The device of claim 1, wherein the attachment points enable engagement of the device to a flexible flotation ring, said attachment guiding structure directing attachment thereto.

3. The device of claim 1, said cap further comprising a fire-resistant compound disposed within the tube.

4. The device of claim 1, wherein the fire-monitoring electronic unit is configured to measure and record temperature of the cylindrical body and capacitance between the body cover and the shell.

5. The device of claim 1, wherein the openings on the shell are slots disposed in an offset parallel relationship, said shell positioned at a proximate distance such that a liquid flows through the slots thereby enabling measurement of capacitance of the liquid.

6. The device of claim 5, wherein the liquid is fresh water, sea water, oil, or a combination thereof.

7. The device of claim 1, wherein the means for powering the device comprises one or more batteries.

8. The device of claim 1, wherein the body housing is resistant to temperature increase.

9. The device of claim 1, further comprising:
an ignition unit disposed around the body housing and having a plurality of ignition tubes;
a control unit configured to receive a wireless ignition signal;
a fuse, disposed within each ignition unit, in electronic communication with the control unit; and
a flare, disposed within each ignition unit, in contact with the fuse.

10. A flotation unit for monitoring a burning fire area, comprising:
a temperature-resistant body housing having a body cover disposed thereon;
a cap disposed on an upper end of the body housing;
a tube extending downwardly from an upper surface of the cap to the fire-monitoring electronic unit;
a pair of attachment points diametrically disposed on a lower end of the body housing;
an attachment guiding structure disposed proximate to the attachment points;
a fire-monitoring electronic unit disposed within the body housing;
one or more batteries disposed within the body housing;
an antenna disposed exteriorly through the cap and within the tube and in electronic communication with the fire-monitoring electronic unit;
a shell disposed around and proximate to the body cover of the body housing and comprising a plurality of openings on the surface thereof; and
an ignition unit disposed around the shell having:
a control unit in electronic communication with the flotation unit; and
a plurality of ignition tubes each containing a fuse in electronic communication with the control unit and a flammable material comprising a flare in contact with the fuse.

11. The flotation unit of claim 10, further comprising a fire-resistant compound disposed within the tube in protective relationship to the antenna.

12. The flotation unit of claim 10, wherein the fire-monitoring electronic unit comprises means for measuring and recording temperature of the body housing and capacitance between the body cover and the shell.

13. A system for in situ monitoring of a burning fire area at sea, comprising:
a plurality of the flotation units of claim 10;
a first collecting unit, each of said flotation units comprising the plurality in wireless communication with the other flotation units and with the first collecting unit;
one or more computers in electronic communication with the first collecting unit; and
software applications tangibly stored in the one or more computers comprising processor-executable instructions enabling analysis and display of data received from the first collecting unit.

14. The in situ monitoring system of claim 13, further comprising a second collecting unit in wireless communication with the plurality of flotation units, said second collecting unit in electronic communication with the one or more computers.

15. The in situ monitoring system of claim 13, further comprising a plurality of interconnectable, compressible flotation rings, each of said flotation rings comprising attachment rings disposed around the perimeter thereof whereby the flotation rings are interconnected, said attachment rings configured to receive the flotation units therein.

16. The in situ monitoring system of claim 15, wherein a plurality of the interconnected flotation rings comprises a net securing the flotation units thereto.

17. The in situ monitoring system of claim 16, wherein the net is compressed and wound around a reel for subsequent deployment at sea.

18. A method for in situ monitoring of burning oil in real time, comprising the steps of:
deploying the net comprising the plurality of the flotation units of the system of claim 13 onto an area of an oil slick;
activating the flotation units;
igniting the area of oil slick;
recording in real time a position of each flotation unit and the temperature and capacitance data at each of the flotation units disposed within the burning area; and
wirelessly transmitting the recorded data to first and second collecting units and thereby to computers electronically linked thereto for monitoring of said data.

19. The method of claim 18, further comprising calculating distance between flotation units and surface area of the burning oil via software tangibly stored in a computer memory.

20. The method of claim 18, further comprising video monitoring the burning area and displaying the video in real time with the transmitted recorded data.

21. The method of claim 18, wherein the step of activating the flotation units comprises activating the electronic units within the flotation units and registering the flotation units with the first and second collecting units.

\* \* \* \* \*